(12) United States Patent  
Carstensen et al.

(10) Patent No.: US 10,843,434 B2  
(45) Date of Patent: Nov. 24, 2020

(54) CORE MATERIAL FOR COMPOSITE STRUCTURES

(71) Applicant: Sikorsky Aircraft Corporation, Stratford, CT (US)

(72) Inventors: Thomas A. Carstensen, Shelton, CT (US); Jonathan K. Garhart, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 73 days.

(21) Appl. No.: 15/580,197

(22) PCT Filed: Jun. 22, 2016

(86) PCT No.: PCT/US2016/038654  
§ 371 (c)(1),  
(2) Date: Dec. 6, 2017

(87) PCT Pub. No.: WO2016/209889  
PCT Pub. Date: Dec. 29, 2016

(65) Prior Publication Data  
US 2018/0169993 A1    Jun. 21, 2018

Related U.S. Application Data

(60) Provisional application No. 62/182,954, filed on Jun. 22, 2015.

(51) Int. Cl.  
*B32B 3/12* (2006.01)  
*B29D 24/00* (2006.01)  
(Continued)

(52) U.S. Cl.  
CPC .............. *B32B 3/12* (2013.01); *B29D 24/005* (2013.01); *B32B 2250/03* (2013.01);  
(Continued)

(58) Field of Classification Search  
CPC ... B32B 3/12; B32B 2305/024; B29D 24/005; B33Y 80/00  
(Continued)

(56) References Cited

U.S. PATENT DOCUMENTS 2,793,718 A    5/1957 Pajak  
2,814,717 A    11/1957 Hardesty  
(Continued)

FOREIGN PATENT DOCUMENTS

| CA | 2859329 A1 | 3/2015 | |
| DE | 102012016309 A1 | 2/2014 | |
| DE | 102012016309 B | * 2/2014 | ............... B32B 3/12 |

OTHER PUBLICATIONS

Extended European Search Report for Application No. 16815173.6 dated Feb. 22, 2019; 9 Pages.  
(Continued)

*Primary Examiner* — Tri V Nguyen  
(74) *Attorney, Agent, or Firm* — Foley & Lardner LLP

(57) ABSTRACT

A unitary core panel for a composite sandwich structure includes a plurality of cell walls defining a plurality of core cells, the plurality of cell walls extending across a thickness of the core, the plurality of core cells including one or more defined structural nonuniformities resulting in nonuniform properties of the core panel. A method of forming a core panel for a composite sandwich structure includes determining structural requirements of the core panel, designing the core panel to satisfy the structural requirements with one or more local nonuniformities in the core panel, and manufacturing the core panel as a unitary core panel with the one or more local nonuniformities.

12 Claims, 4 Drawing Sheets

(51) Int. Cl.
*B33Y 80/00* (2015.01)
*F16B 5/01* (2006.01)

(52) U.S. Cl.
CPC ..... *B32B 2250/04* (2013.01); *B32B 2262/101* (2013.01); *B32B 2262/103* (2013.01); *B32B 2262/106* (2013.01); *B32B 2305/024* (2013.01); *B33Y 80/00* (2014.12); *F16B 5/01* (2013.01)

(58) Field of Classification Search
USPC .......................................... 428/73, 116, 593
See application file for complete search history.

(56) References Cited

U.S. PATENT DOCUMENTS

| | | | |
|---|---|---|---|
| 3,072,225 | A | 1/1963 | Cremer et al. |
| 4,078,422 | A | 3/1978 | Brunsch et al. |
| 4,095,322 | A | 6/1978 | Scarpati et al. |
| 4,968,367 | A * | 11/1990 | Diderich ............ B29D 99/0003 156/182 |
| 5,475,622 | A | 12/1995 | Reinfelder et al. |
| 8,360,733 | B2 | 1/2013 | Bell et al. |
| 8,851,856 | B2 | 10/2014 | Vertel |
| 8,870,547 | B2 | 10/2014 | Grase et al. |
| 2009/0252608 | A1 | 10/2009 | Metivier |
| 2013/0000247 | A1 * | 1/2013 | Sypeck ................. B21D 47/00 52/793.1 |
| 2013/0189086 | A1 | 7/2013 | Bayer et al. |
| 2014/0199175 | A1 | 7/2014 | Godfrey et al. |
| 2014/0341746 | A1 | 11/2014 | Leahy et al. |
| 2014/0377076 | A1 | 12/2014 | Kennedy et al. |
| 2015/0003970 | A1 | 1/2015 | Feldmann et al. |
| 2018/0044002 | A1 | 2/2018 | Cotton et al. |

OTHER PUBLICATIONS

Extended European Search Report for Application No. 17185552.1 dated Feb. 12, 2018; 8 pgs.
Bhate, D., et al., "Analytical, Experimental and Numerical Studies of the Mechanical Behavior of ULTEM-9085 Honeycomb Structures", 2016 RAID, Phoenix Analysis & Design Technologies, ASU; 44 pgs.
Jones, R., Sandwich Composite Production Cost Reduced 52% with Direct Digitial Manufacturing SSYS-CS-Fortus-Aviradyne Jul. 13, Retreived from—http://www.stratasys.com/resources/case-studies/commercial-products/aviradyne.
PCT ISR Written Opinion; International Application No. PCT/US16/38654; International Filing Date: Jun. 22, 2016; dated Sep. 7, 2016; pp. 1-5.
PCT Notification of Transmittal of the International Search Report of the International Searching Authority; International Application No. PCT/US16138654; International Filing Date: Jun. 22, 2016; dated Sep. 7, 2016; pp. 1-7.

* cited by examiner

CORE MATERIAL FOR COMPOSITE STRUCTURES

CROSS REFERENCE TO RELATED APPLICATIONS

This application is a National Stage application of PCT/US2016/038654, filed Jun. 22, 2016, which claims the benefit of U.S. Provisional Application No. 62/182,954, filed Jun. 22, 2015, both of which are incorporated by reference in their entirety herein.

BACKGROUND

The subject matter disclosed herein generally relates to composite structures. More specifically, the present disclosure relates to core materials for composite structures.

Light weight composite structures often comprise a sandwich structure with a honeycomb core positioned between and adhered to a skin at either side of the honeycomb core. In the current state of the art the core is formed as a bulk product as a panel with a plurality of hexagonal cells of fixed and uniform size and orientation, defining the properties of the core panel. The core panel is typically formed from a plurality of ribbons of material, formed into the hexagonal cells and adhered to each other. Due to the manufacturing process, the core panel has inherently different orthogonal properties in different directions, based on a ribbon direction of the core panel. Because of the directional nature of the core material properties, the material selection for a given structure is often constrained by the lowest properties of the core material and the highest stress condition identified for the structure. This leads to substantial constraints in structural design and optimization, and structures are as a result, heavier than necessary.

BRIEF SUMMARY

In one embodiment, a unitary core panel for a composite sandwich structure includes a plurality of cell walls defining a plurality of core cells, the plurality of cell walls extending across a thickness of the core, the plurality of core cells including one or more defined structural nonuniformities resulting in nonuniform properties of the core panel.

Additionally or alternatively, in this or other embodiments the structural nonuniformity is one or more of nonuniform core cell density, nonuniform core cell shape, or nonuniform core cell size.

Additionally or alternatively, in this or other embodiments the core cell density is increased in areas of the core panel with increased stresses.

Additionally or alternatively, in this or other embodiments the core cell size is decreased in areas of the core panel with increased stresses.

Additionally or alternatively, in this or other embodiments the nonuniformity includes a variation in cell wall thickness.

Additionally or alternatively, in this or other embodiments the core panel is formed via one of material deposition.

Additionally or alternatively, in this or other embodiments one or more material properties of the core panel material vary across the core panel or through a core panel thickness.

Additionally or alternatively, in this or other embodiments one or more end flanges are located at a cell wall.

In another embodiment, a composite sandwich structure includes a skin and a core panel adhered to the skin. The core panel includes a plurality of cell walls defining a plurality of core cells, the plurality of cell walls extending across a thickness of the core, the plurality of core cells including one or more defined structural nonuniformities resulting in nonuniform properties of the core panel.

Additionally or alternatively, in this or other embodiments the structural nonuniformity is one of nonuniform core cell density, nonuniform core cell shape, or nonuniform core cell size.

Additionally or alternatively, in this or other embodiments the core cell density is increased in areas of the core panel with increased stresses.

Additionally or alternatively, in this or other embodiments the core cell size is decreased in areas of the core panel with increased stresses.

Additionally or alternatively, in this or other embodiments the nonuniformity includes a variation in cell wall thickness.

Additionally or alternatively, in this or other embodiments the core panel is formed via material deposition.

Additionally or alternatively, in this or other embodiments one or more material properties of a core panel material vary across the core panel or through a core panel thickness.

Additionally or alternatively, in this or other embodiments one or more end flanges are located at a cell wall.

In yet another embodiment, a method of forming a core panel for a composite sandwich structure includes determining structural requirements of the core panel, designing the core panel to satisfy the structural requirements with one or more local nonuniformities in the core panel, and manufacturing the core panel as a unitary core panel with the one or more local nonuniformities.

Additionally or alternatively, in this or other embodiments the core panel is manufactured utilizing an additive manufacturing process.

Additionally or alternatively, in this or other embodiments the wherein the local nonuniformity is one or more of nonuniform core cell density, nonuniform core cell shape, or nonuniform core cell size.

Additionally or alternatively, in this or other embodiments one or more material properties of the core panel material vary across the core panel or through a core panel thickness.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
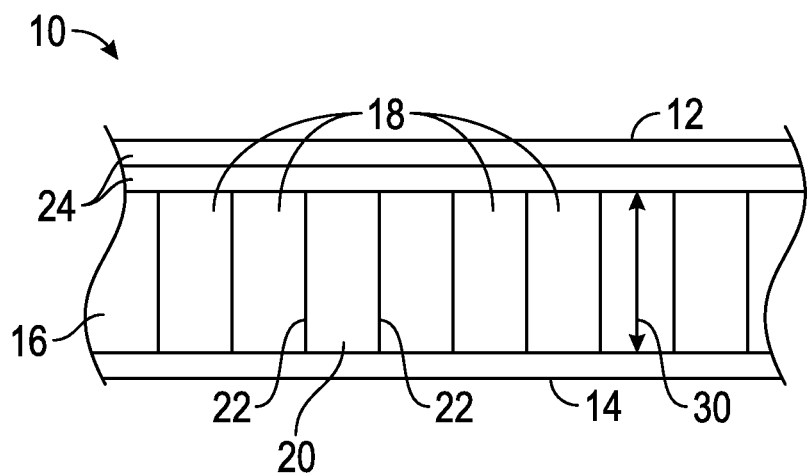
FIG. 1 is a cross-sectional view of an embodiment of a composite sandwich structure.

Referring to the cross-sectional view of FIG. 1, a composite sandwich panel 10, used for example to construct skins, frames, bulkheads and/or beam structures, includes a first skin 12 and a second skin 14 with a core panel 16 sandwiched between the first skin 12 and the second skin 14, and adhered to the first skin 12 and the second skin 14. The core panel 16 includes a plurality of cells 18, each cell 18 defined as a cell opening 20 bounded by a cell wall 22. The cell wall 22 extends from the first skin 12 to the second skin 14. The first skin 12 and the second skin 14 may be formed from a variety of materials, such as fiberglass, carbon fiber material, or a metal material such as titanium or aluminum. Further the first skin 12 and/or the second skin 14 may be formed from a single layer of material, or may alternatively be a multilayer laminate structure formed with a plurality of skin layers 24 or plies adhered to each other. The first skin 12 and the second skin 14 may be preformed before adhering to the core panel 16 or may be formed in the same process as the sandwich panel 10.

Figure 2:
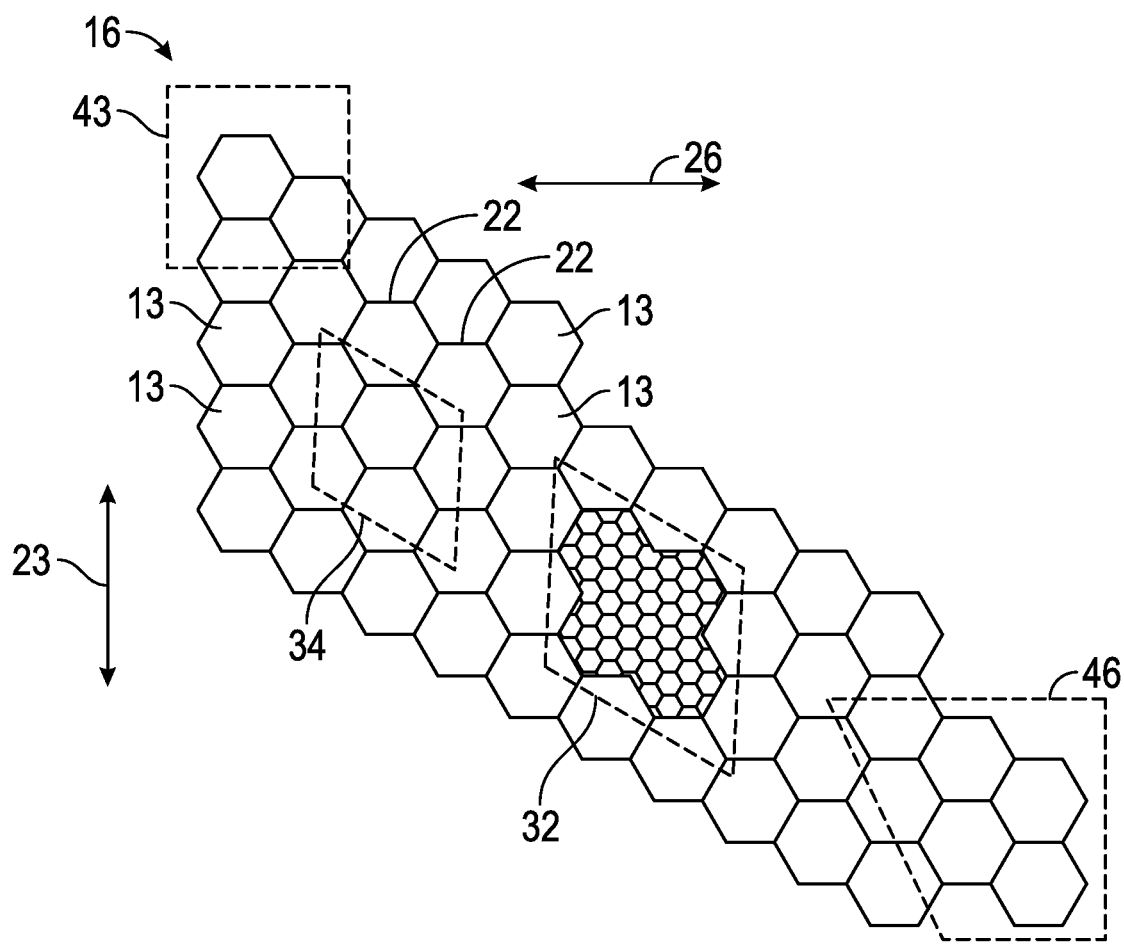
FIG. 2 is a plan view of an embodiment of a core panel with varying core cell sizes and other features for a composite sandwich structure.

Referring to FIG. 2, an embodiment of a core panel 16 is shown. The core panel 16 is formed to have engineered non-uniform properties along a panel length 26, panel width 28, and/or panel thickness 30 (shown in FIG. 1). The properties are engineered to be non-uniform in order to locally optimize the properties of core panel 16 relative to core panel 16 weight. Specifically, characteristics of the core panel 16 are varied throughout the core panel 16 such that each portion of the core panel 16 is designed based on the stresses encountered or anticipated by the portion of the core panel 16, without needing to overdesign the core panel 16.

For example, referring to FIG. 2, in some embodiments, a density of core cells 18 is varied based on the anticipated stresses. In a relatively high stress area 32, the core cells 18 are smaller sized and more tightly packed, while in a relatively low stress area 34, the core cells 18 are larger.

Figure 3:
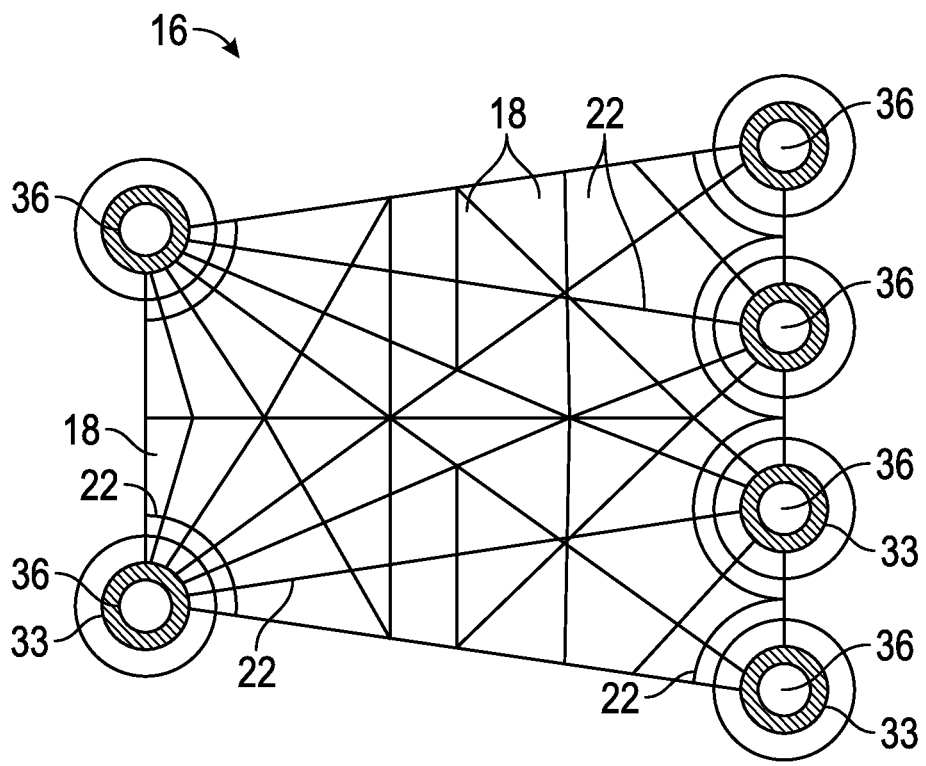
FIG. 3 is a plan view of another embodiment of a core panel for a composite sandwich structure illustrating varying core cell shapes and features.

In other embodiments, such as shown in FIG. 3, core cell 18 shape and/or orientation is modified based on the stress levels or other requirements of the design. For example, as shown, the core panel 16 may be formed from core cells 18 that are triangular, rectangular, or other polygon shape. The core cells 18 may vary in size, shape and/or orientation in the panel. In such a structure, cell walls 22 may be oriented to follow an anticipated design load path through the core panel 16. The core panel 16 may include other features such as integrated fastener locations 36 used for later assembly steps. The fastener locations 36 may include a reinforcement zone 38 of substantially solid core panel 16 material around the fastener location 36. Further, the core panel 16 may include curvilinear cell walls 22.

Figure 4:
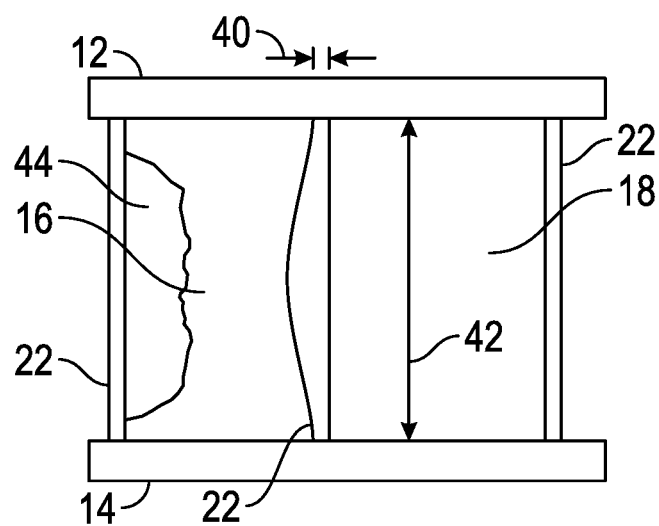
FIG. 4 is a cross-sectional view of yet another embodiment of a core panel for a composite sandwich structure, illustrating varying core cell wall thicknesses and other features.
Figure 5:
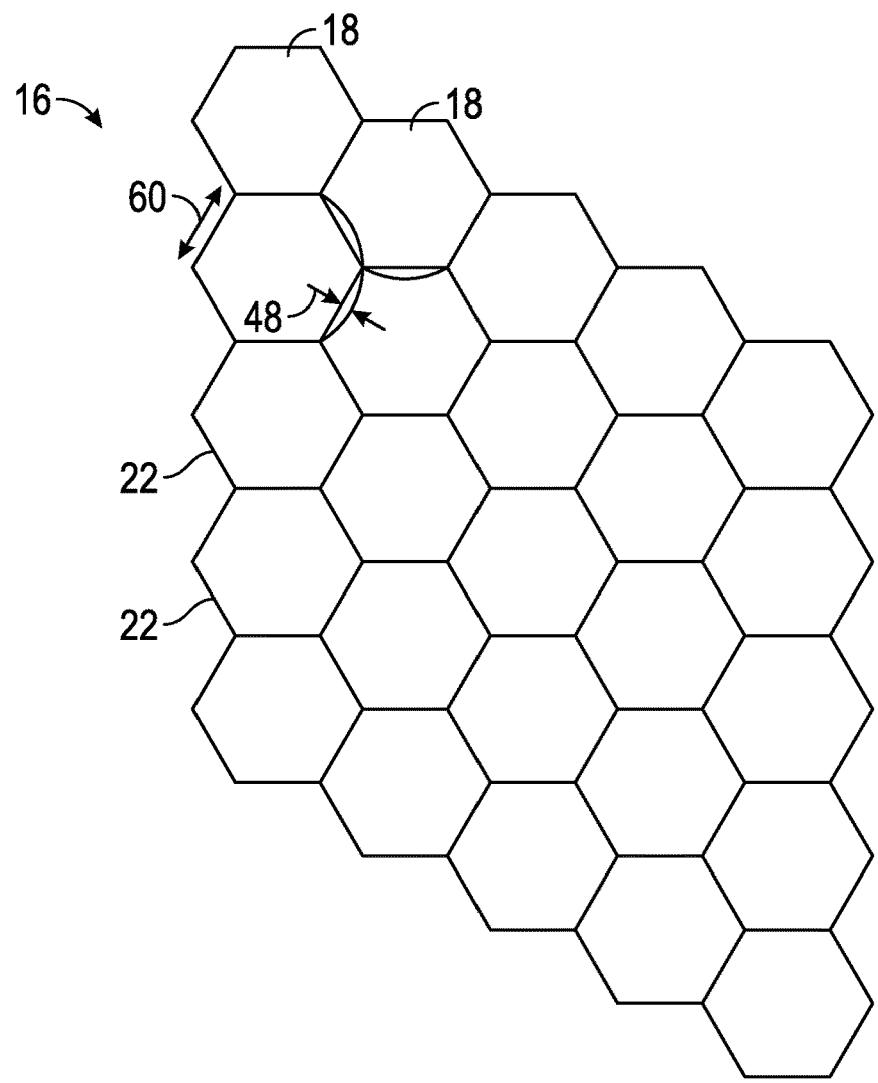
FIG. 5 is a plan view of still another embodiment of a core panel for a composite sandwich structure illustrating varying core cell wall thicknesses and other features.

Referring to the cross-sectional view of FIG. 4 and the plan view of FIG. 5, in other embodiments, a cell wall thickness 40 is varied along a cell height 42 and/or cell wall length 60, and may include stiffening ribs 44 or other localized features, such as slits or openings. In addition to, or as an alternative to varying cell wall thickness 40, the cell wall 22 material itself may be varied in the cell wall 22. For example, a first material may be used for a first portion of the cell wall 22, while a second material is utilized for a second portion of the cell wall 22, to locally vary selected properties of the core panel 16. Further, referring again to FIG. 3, the material may also be varied by core panel 16 section. For example, a first core panel portion 46 (shown in FIG. 2) may be formed from a first material, while a second core panel portion 48 (shown in FIG. 2) may be formed from a second material having different selected properties than the first material. As well as providing design flexibility to meet structural load requirements, the materials and core panel 16 configuration may be selected to locally vary conductivity, such as electrical or thermal conductivity, or to locally tune vibration damping or other properties of the core panel 16.

Figure 6:
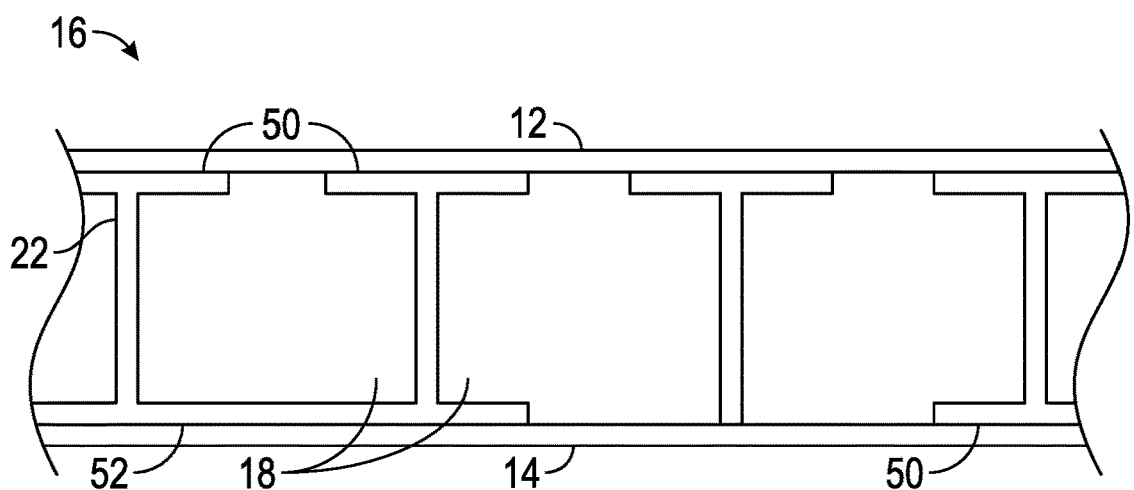
FIG. 6 is a cross-sectional view of another embodiment of a core panel for a composite sandwich structure, illustrating core cells with end flanges and other features.
Figure 7:
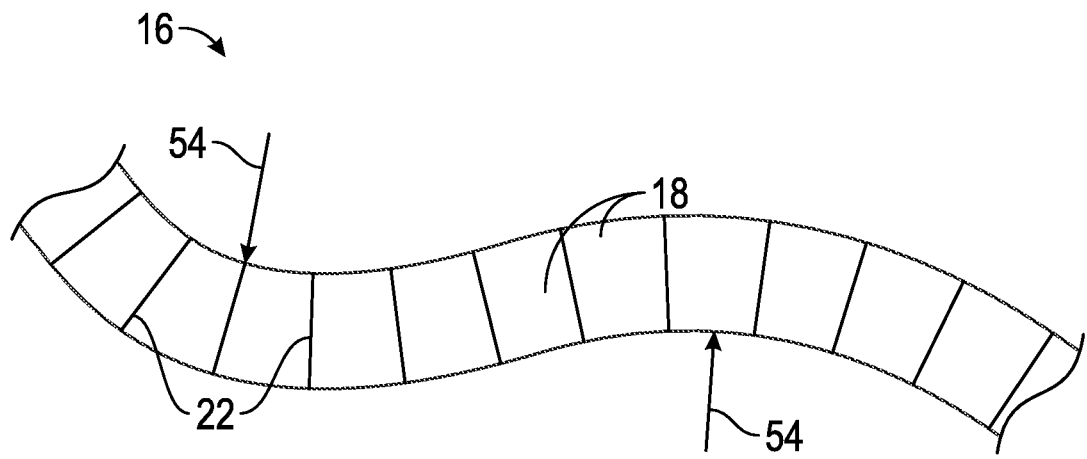
FIG. 7 is an end view of yet another embodiment of a core panel for a composite laminate structure illustrating a curved core cell panel and other features.

In another embodiment, shown in FIG. 6, the core panel 16 is formed with an end flange 50 at some of the core cells 18 to increase surface area for adhesion to the first skin 12 and/or second skin 14. Additionally, in some embodiments, the core panel 16 may be formed with a closed cell end 52 at one or more ends of the core cell 18. In other embodiments, as shown in FIG. 7, the core panel 16 is formed with one or more radius of curvature 54 to form a contoured sandwich panel (not shown)

It is to be appreciated that while for clarity of the description and drawings, the core cell 18 modifications or nonuniformities are presented separately, one skilled in the art will readily recognize that the nonuniformities shown in FIGS. 2-7 may be combined in design of the core panel 16.

Figure 8:
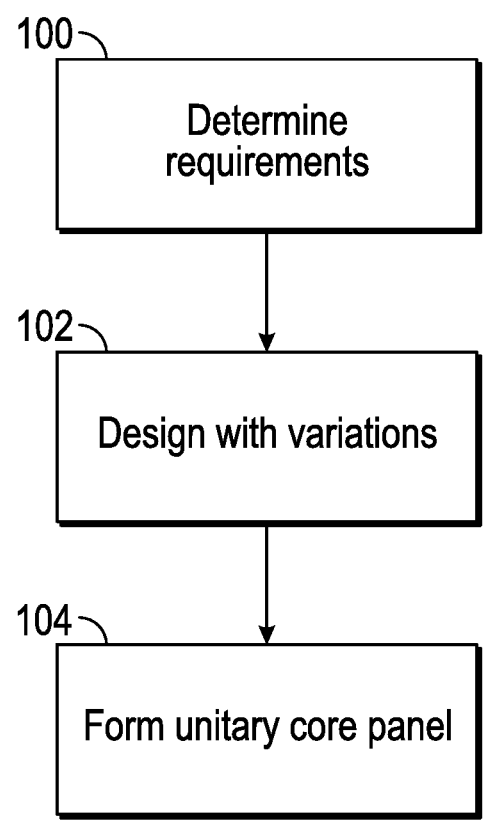
FIG. 8 is a schematic illustration of a method of manufacturing a core panel.

Core panels with engineered non-uniform properties such as in the present disclosure allows for core panels 16 to be engineered to have precisely the mechanical properties required by the design. Further, those properties can be continuously tailored to change from one area of the core panel to another as engineering requirements vary for optimization of the core panel. Additionally, such core panels allow for a reduction in core splicing and potting, which require additional manufacturing steps such as trimming, forming, and stabilizing. A method of manufacturing a core panel 16 is illustrated in FIG. 8. Structural and/or dimensional requirements for a core panel 16 are determined in block 100. The core panel 16 is designed with localized variations as described above utilizing, for example, finite element analysis or other design and analysis tools in block 102. This design is modified or iterated until the selected requirements are met by the core panel 16. Once the core panel design is established, the core panel 16 is manufactured at block 104 by one or more manufacturing methods based on the material utilized and/or the desired structure of the core panel 16. These manufacturing methods may include additive manufacturing methods such as material deposition, 3-D printing, laser sintering, or the like. Such manufacturing processes allow for the formation of a unitary core panel 16 having locally varied properties and dimensional features as described above. Additive manufacturing methods used in formation of the core panel 16 provide a high degree of flexibility in fabrication options enabling local optimization.

Core panels with engineered non-uniform properties such as in the present disclosure allow for core panels to be engineered to have precisely the mechanical properties required by the design. Further, those properties can be continuously tailored to change from one area of the core panel to another as engineering requirements vary for optimization of the core panel. Additionally, such core panels allow for a reduction in core splicing and potting, which require additional manufacturing steps such as trimming, forming, and stabilizing.

While the present disclosure has been described in detail in connection with only a limited number of embodiments, it should be readily understood that the present disclosure is not limited to such disclosed embodiments. For instance, the core panel and composite sandwich panel described herein may be utilized in a variety of applications, such as aircraft, wind turbines, maritime propulsion, ground transportation (bus, rail, truck, etc.) Further, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A unitary core panel for a composite sandwich structure comprising:
    a plurality of cell walls defining a plurality of core cells, the plurality of cell walls extending across a thickness of the core, the plurality of core cells including one or more defined structural nonuniformities resulting in nonuniform properties of the core panel, wherein the structural nonuniformities include at least one cell wall of the plurality of cell walls having a cell wall thickness of a core cell varied in a direction between a first skin and a second skin in which the at least one cell wall comprises a greater cell wall thickness in a middle portion than end portions in the direction between the first skin and the second skin.

2. The core panel of claim 1, wherein the structural nonuniformity is one or more of nonuniform core cell density, nonuniform core cell shape, or nonuniform core cell size.

3. The core panel of claim 2, wherein the core cell density is increased in areas of the core panel with increased stresses.

4. The core panel of claim 2, wherein the core cell size is decreased in areas of the core panel with increased stresses.

5. The core panel of claim 1, wherein the nonuniformity includes a variation in cell wall thickness.

6. The core panel of claim 1, wherein the at least one cell wall or another at least one cell wall of the plurality of cell walls comprises a first material and a second material different from the first material.

7. The core panel of claim 1, wherein one or more material properties of the core panel material vary across the cell wall thickness.

8. The core panel of claim 1, further comprising one or more end flanges disposed at a cell wall.

9. A method of forming a core panel for a composite sandwich structure, comprising:
    determining structural requirements of the core panel;
    designing the core panel to satisfy the structural requirements with one or more local nonuniformities in the core panel; and
    manufacturing the core panel as a unitary core panel with the one or more local nonuniformities, wherein the one or more local nonuniformities include at least one cell wall of the plurality of cell walls having a cell wall thickness of a core cell varied in a direction between a first skin and a second skin in which the at least one cell wall comprises a greater cell wall thickness in a middle portion than end portions in the direction between the first skin and the second skin.

10. The method of claim 9, wherein the core panel is manufactured utilizing an additive manufacturing process.

11. The method of claim 9, wherein the local nonuniformity is one or more of nonuniform core cell density, nonuniform core cell shape, or nonuniform core cell size.

12. The method of claim 9, wherein one or more material properties of the core panel material vary through the cell wall thickness.

* * * * *